United States Patent [19]
Hochholzer

[11] Patent Number: 5,881,689
[45] Date of Patent: Mar. 16, 1999

[54] DEVICE TO CONTROL VALVES OF AN INTERNAL COMBUSTION ENGINE, ESPECIALLY THE GAS SUPPLY VALVE OF A GAS ENGINE

[75] Inventor: Timo Hochholzer, Augsburg, Germany

[73] Assignee: Man B&W Diesel Aktiengesellschaft, Augsburg, Germany

[21] Appl. No.: 749,818

[22] Filed: Nov. 15, 1996

[30] Foreign Application Priority Data

Nov. 18, 1995 [DE] Germany ............... 195 43 080.8

[51] Int. Cl.$^6$ ............... F01L 9/02; F01L 13/00
[52] U.S. Cl. ............... 123/90.12; 123/90.15
[58] Field of Search ............... 123/90.12, 90.15, 123/90.16, 90.17

[56] References Cited

U.S. PATENT DOCUMENTS

| | | | |
|---|---|---|---|
| 2,602,434 | 7/1952 | Barnaby | 123/90.12 |
| 3,682,152 | 8/1972 | Muller-Berner | 123/90.12 |
| 4,231,543 | 11/1980 | Zurner et al. | 123/90.12 |
| 5,335,633 | 8/1994 | Thien | 123/90.12 |
| 5,410,994 | 5/1995 | Schechter | 123/90.12 |
| 5,456,222 | 10/1995 | Schechter | 123/90.12 |
| 5,456,223 | 10/1995 | Miller et al. | 123/90.12 |
| 5,497,736 | 3/1996 | Miller et al. | 123/90.15 |
| 5,582,141 | 12/1996 | Meyer | 123/90.12 |
| 5,638,781 | 6/1997 | Sturman | 123/90.12 |

FOREIGN PATENT DOCUMENTS

| | | |
|---|---|---|
| 3135650 | 3/1983 | Germany . |
| 4303299 | 8/1994 | Germany . |

*Primary Examiner*—Weilun Lo
*Attorney, Agent, or Firm*—Cohen, Pontani, Lieberman & Pavane

[57] ABSTRACT

A device to control valves of an internal combustion engine, especially the gas supply valve of a gas engine, which can be operated by a piston of a working cylinder, which can be pressurized with a pressure medium against the return force of a spring. A control device, preferably designed as a control slide valve, which has a movable control apparatus by way of which a work space of the working cylinder can be pressurized with the pressure medium in order to open the valve and relieved in order to close the valve, is arranged before the piston on the pressurization side. The movable control apparatus can itself be controlled by an associated pilot control device. It is possible to control the opening timepoint and closing timepoint of the control valve independently of one another and independently of the inlet valve, because the control apparatus of the control device without a return spring can be brought into the position that pressurizes the steam space with pressure medium and, independently thereof, into the relief position by the pilot control device.

14 Claims, 3 Drawing Sheets

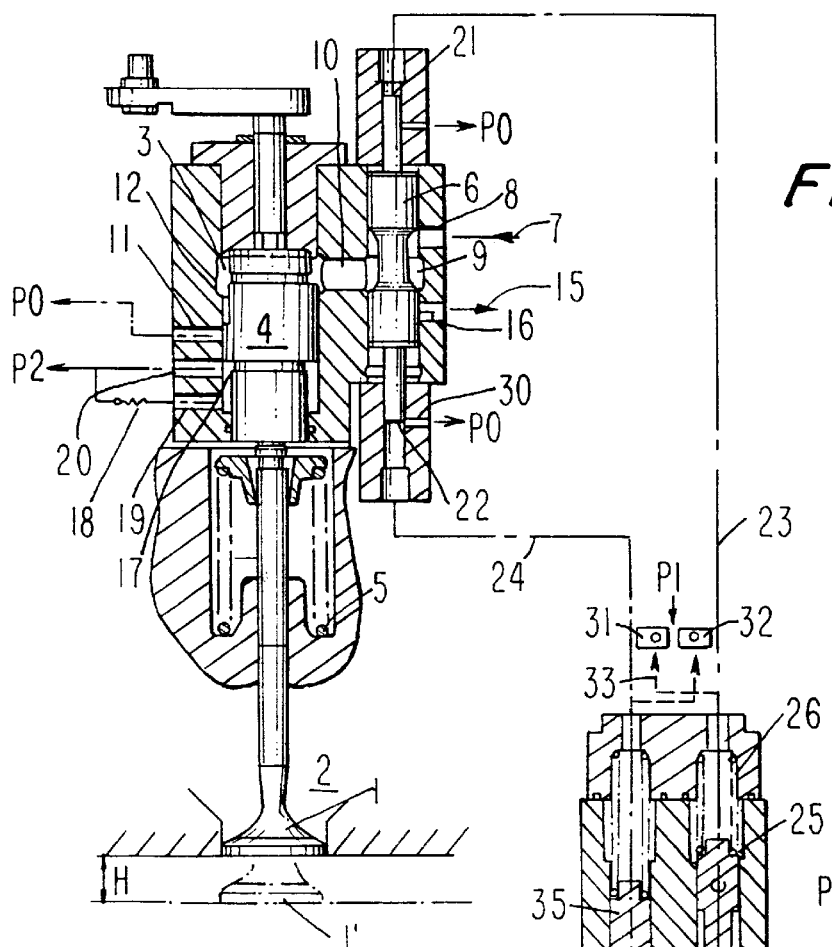
FIG.1A
FIG.1C
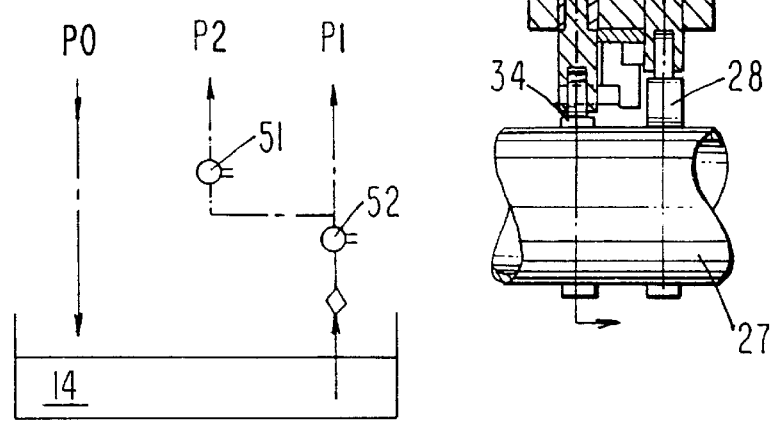
FIG.1B

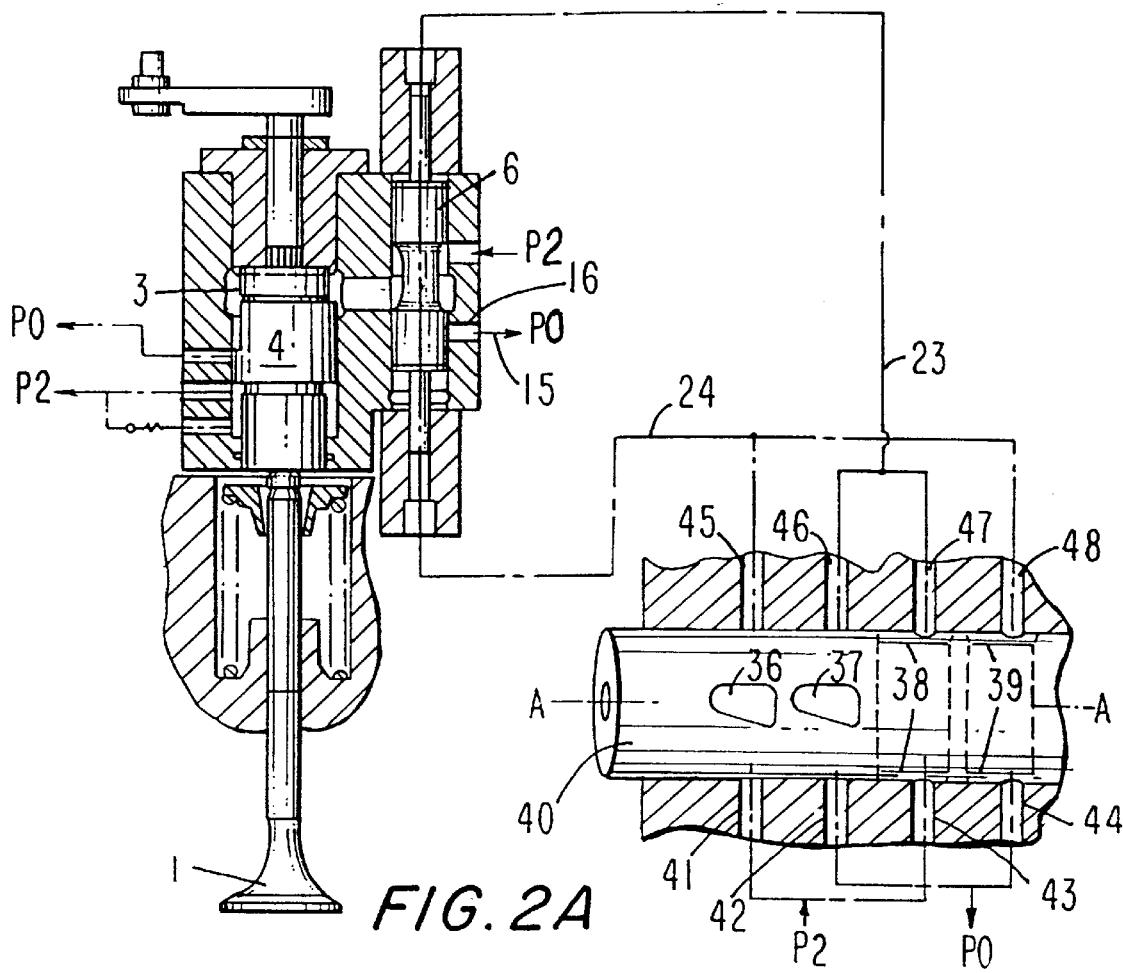
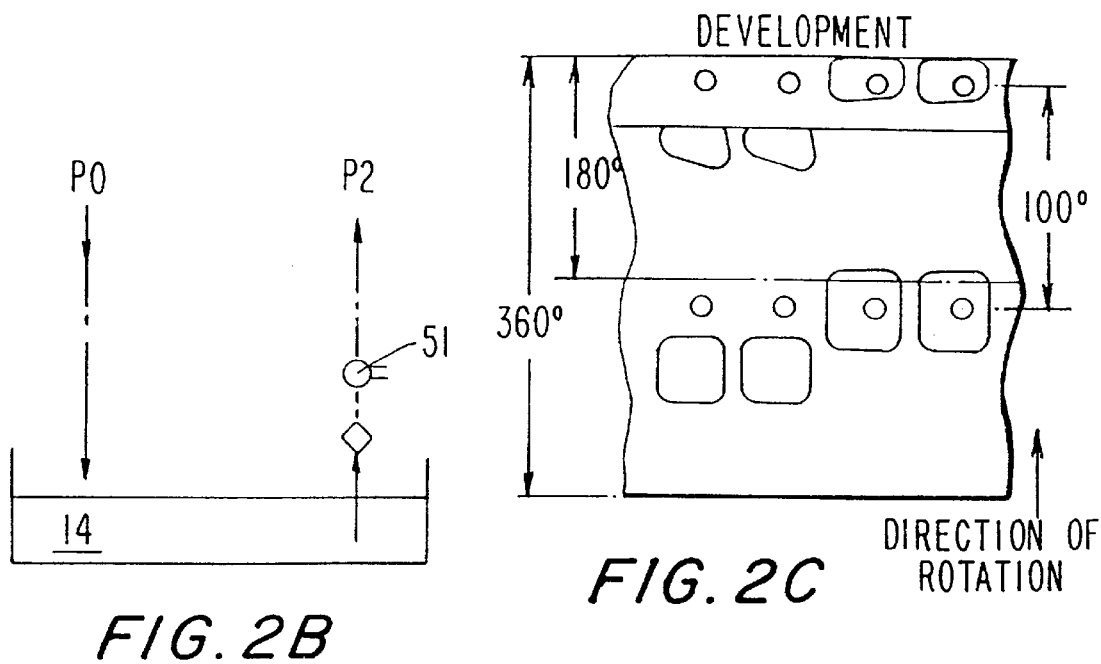
FIG. 2A
FIG. 2B
FIG. 2C

DEVICE TO CONTROL VALVES OF AN INTERNAL COMBUSTION ENGINE, ESPECIALLY THE GAS SUPPLY VALVE OF A GAS ENGINE

BACKGROUND OF THE INVENTION

1. Field of the Invention

The invention relates to a device for controlling at least one valve of an internal combustion engine, especially the gas supply value of a gasoline engine, which can be operated by a piston of a working cylinder that can be pressurized by a pressure medium, preferably against the return force of a spring, before which, on the pressurization side, a control device is arranged, preferably in the form of a control slide valve. The control device has a movable control apparatus, which can be used to pressurize a steam space of the working cylinder with the pressure medium for the purpose of opening the valve and to relieve the pressurized space for the purpose of closing the valve. The control apparatus itself can be controlled by means of an associated pilot control device.

2. Description of the Prior Art

German reference DE 43 03 299 A1 discloses a control system of this type for the gas supply valve of a gasoline engine. In the disclosed system, a control device in the form of a control slide valve can be deflected against the return force of a spring, which is arranged above the control slide valve in a cylinder that accommodates the control slide valve, as the result of pressurization, which is initiated by a pilot control device, of a surface of the control slide valve in the axial direction of the control slide valve. In this way, a high-pressure hydraulic line is connected to a working space of a working cylinder, so that the piston arranged in this working space and connected to the gas valve is subjected to high pressure and deflected against the force of a return spring. In the pilot control device, the hydraulic pressure is connected to a pressure line that leads to a surface of the control slide valve. This connection occurs as the result of the deflection of a piston, which has a control recess and is controlled by a camshaft and operates the control shaft that controls the inlet valve of the gas engine. The stroke of the piston can be set by turning a lever that is located on a working cylinder of the piston connected to the gas supply valve. The duration of opening can be set by turning a lever that is arranged on the pilot control device and connected to a pilot-control-device piston, which pressurizes a surface of the control slide valve via a control recess. In this arrangement, the opening timepoint and the closing timepoint of the controlled gas valve cannot be adjusted independently of each other or independently of the control exercised on the inlet valve of the internal combustion engine.

German reference DE 31 35 650 C2 discloses an arrangement that permits adjustment of the opening duration of an inlet valve for an internal combustion engine. The arrangement has a cam seated on a shaft, which deflects a piston. The piston is connected to a second piston, which in turn is connected to the inlet valve, via a hydraulic column enclosed in the normal state.

In order to close the inlet valve while the first piston is still deflected by the cam and thus to adjust the opening duration of the inlet valve, the hydraulic fluid between the two pistons can be released. When this happens, the lower piston, which is connected to the inlet valve, is returned by a return spring, so that the inlet valve closes.

To allow the hydraulic fluid to emerge from the space between the two pistons, there is a valve actuator that in the normal state blocks a recycling line for the hydraulic fluid. The extension of the valve actuator is clamped between a piezoelectric column and an anvil and is held in this position by means of a pressure spring. In order to shorten the opening duration of the inlet valve by releasing the recycling line, the extension of the valve actuator can be released by the application of a voltage signal to the piezoelectric column, so that the valve actuator is moved against the force of the return spring by means of the pressure available in the deflected state of the pistons and the recycling line is released, so that hydraulic oil can flow out between the two pistons, so that the second piston, moving relative to the first piston, can move back, due to the return force of a spring arranged within it, and close the inlet valve.

When the first piston returns to the non-deflected state, the pressure drops between the two cylinders, so that the valve actuator, due to the return force of its return spring, returns to the normal position that closes the recycling line for the hydraulic fluid, where, by interrupting the voltage applied at the piezoelectric column, it can then be clamped between the column and the anvil. Via a back-pressure valve, the space between the two pistons can be refilled with hydraulic fluid from a supply area for hydraulic medium.

This arrangement permits only the opening duration of the inlet valve of an internal combustion engine to be controlled.

U.S. Pat. No. 2,602,434 discloses an arrangement for controlling the start of opening and the stroke of an inlet valve for an internal combustion engine. A lever is provided to control when the inlet valve starts to open. By turning this lever, it is possible to turn an opening-time control edge, which runs obliquely to the axial direction of a piston that can be deflected by a cam. In order to limit the stroke of another piston connected to the inlet valve, another lever can be used to turn a control edge, which is located on the piston in question and opens a relief line to a pressure medium reservoir.

SUMMARY OF THE INVENTION

Starting from the arrangement described above, the object of the present invention is, using the simplest and most economical means possible, to permit the opening timepoint and closing timepoint of the valve being controlled, especially the gas valve, to be controlled independently of one another and independently of the operation of the inlet valve.

Pursuant to this object, and others which will become apparent hereafter, one aspect of the present invention resides in a control member of the control device arranged before the piston that can be brought by means of the pilot control device into a position that pressurizes the steam space with pressure medium and, independently of this, into a relief position.

The arrangement according to the invention makes it possible to control the opening timepoint and the closing timepoint of the gas valve independently of one another and also independently of the operation of the inlet valve of the internal combustion engine. This permits the combustion process to be influenced in a very precise manner. In particular, it is possible to close the gas valve while fresh air passes through the combustion space, in order to prevent any gas from passing through the combustion space and possibly entering the exhaust line. Furthermore, via the interval between the opening timepoint and the closing timepoint of the gas valve, the valve opening duration can be changed. In addition, it is possible to optimize the combustion process by varying the opening timepoint and the closing timepoint in dependence on speed and independently of one another.

When a hydraulic oil, especially the oil in the lubricating oil circuit of the engine, is used as the pressure medium, a return line connected to a hydraulic oil storage means is preferably connected to two return bores located on the control device, which permit recycling of the hydraulic oil when this position is reached.

Advantageously, a pressure supply line connected to a pump fed from the hydraulic oil storage means is connected via the pilot control device to respective pressure lines leading to the respective surfaces of the control slide valve. This permits the opening timepoint and the closing timepoint of the gas valve to be individually controlled in a simple and effective manner by means of pressurization on one pressure line and recycling via the other respective pressure line.

According to another embodiment of the invention, a respective surface of a pilot control forcer, which can be deflected by a control cam arranged on a control shaft, is connected via a pressure line to a respective surface of the control slide valve. In this way, using a camshaft, it is simple to produce pressure surges for the purpose of switchover by translation or rotation of the control slide valve.

Preferably, on a pressure line leading from a surface of a pilot control forcer to a surface of the control slide valve, there is, in each instance, a recycling valve for refilling the pressure line with pressure medium, particularly hydraulic oil, during the downward movement of the pilot control forcer associated with this pressure line. This is to permit the particular pilot control forcer in question, after its deflection by means of a cam, to be returned simply and reliably independently of the position and movement of the other pilot control forcer.

Furthermore, when pressure-surge pressurization of a pressure line is carried out by lifting the associated pilot control forcer, it is preferably possible, by means of this pressure-surge pressurization, to deblock the repulsion valve associated with the other pressure line, in order to permit hydraulic oil to flow out of the latter pressure line in the blocked direction via a deblocking line. This permits the simple and effective translation of the slide-gate valve by eliminating the pressure surge transmitted to the latter pressure line.

The closing timepoint or opening timepoint can be changed in independent and, particularly, stepless fashion by turning the particular pilot control forcer in question, e.g., by means of a lever, using the respective control edge.

According to a further embodiment of the invention, a rotating control apparatus, such as a rotary slide-valve shaft or a control disk, etc., which has passages for the control oil, is provided as the pilot control device. This permits the two pressure lines that lead to the control slide valve to be switched over into a pressure supply line and a return line in a very low-malfunction, low wear and low maintenance fashion. An adjustment of the control times can be attained here by axial movement of the rotary slide-valve shaft and thus of the control edges and/or by turning the rotary slide-valve shaft relative to the camshaft. The rotary slide valve-shaft speed corresponds to the camshaft speed.

Advantageously, in dependence on the rotational position of the rotary slide valve shaft, it is possible to pressurize no more than one of the two pressure lines leading to the faces of the control device, particularly a control slide valve, with the pressure of the hydraulic system and to connect the other pressure line to the oil return container via the recycling line. This permits the precise, synchronous switchover as well as the defined closing of both pressure lines between switchover sequences.

According to a further embodiment of the invention, the pilot control device encompasses an electronic control unit for the electronic control of an operating element that switches, relative to one another, the two pressure lines leading to the control slide valve, i.e., a supply line and a recycling line to the oil return container. This permits a completely universal and programmable control of the opening timepoint and closing timepoint of the control gas valve that is variable at any time, i.e., even during operation. In particular, when the current phase of the internal combustion engine is detected using one or more pickups connected to the electronic control unit, the electronic control unit can be supplied with data that permit it to calculate the required optimal opening timepoint and closing timepoint. Measured data, such as the duration of opening of the inlet valve, the target speed and actual speed of the engine, load states, e.g., acceleration, continual speed, and combustion parameters, can be included in the calculation.

Furthermore, the electronic design of the pilot control unit permits incorporation into a total control concept of the internal combustion engine, because, in particular, the current operating position of the switchover elements and thus of the control apparatus, especially the control slide valve, are known and can be varied at all times.

Advantageously, by means of a switchover device controlled by the electronic control device, the pressure line coming from the movable control apparatus, particularly, from a surface of the control slide valve, can be connected to the pressure supply line, while the other pressure line can be connected synchronously via a recycling line to the oil return container. This ensures that when one pressure line is pressurized by connection to the pressure supply line and upon the resulting deflection of the control apparatus, especially the translation of the control slide valve, the pressure medium, particularly the hydraulic fluid, in the other pressure line, can be pressed out via the recycling line without additional devices and measures in a simple, economical and reliable manner.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIGS. 1A, 1B and 1C show a partial sectional view of the components of a gas engine that interact to control a gas valve via a camshaft;

FIGS. 2A, 2B and 2C show a second embodiment for controlling a gas valve via a rotary slide-valve shaft.

DETAILED DESCRIPTION OF THE PREFERRED EMBODIMENT

Figure 3A:
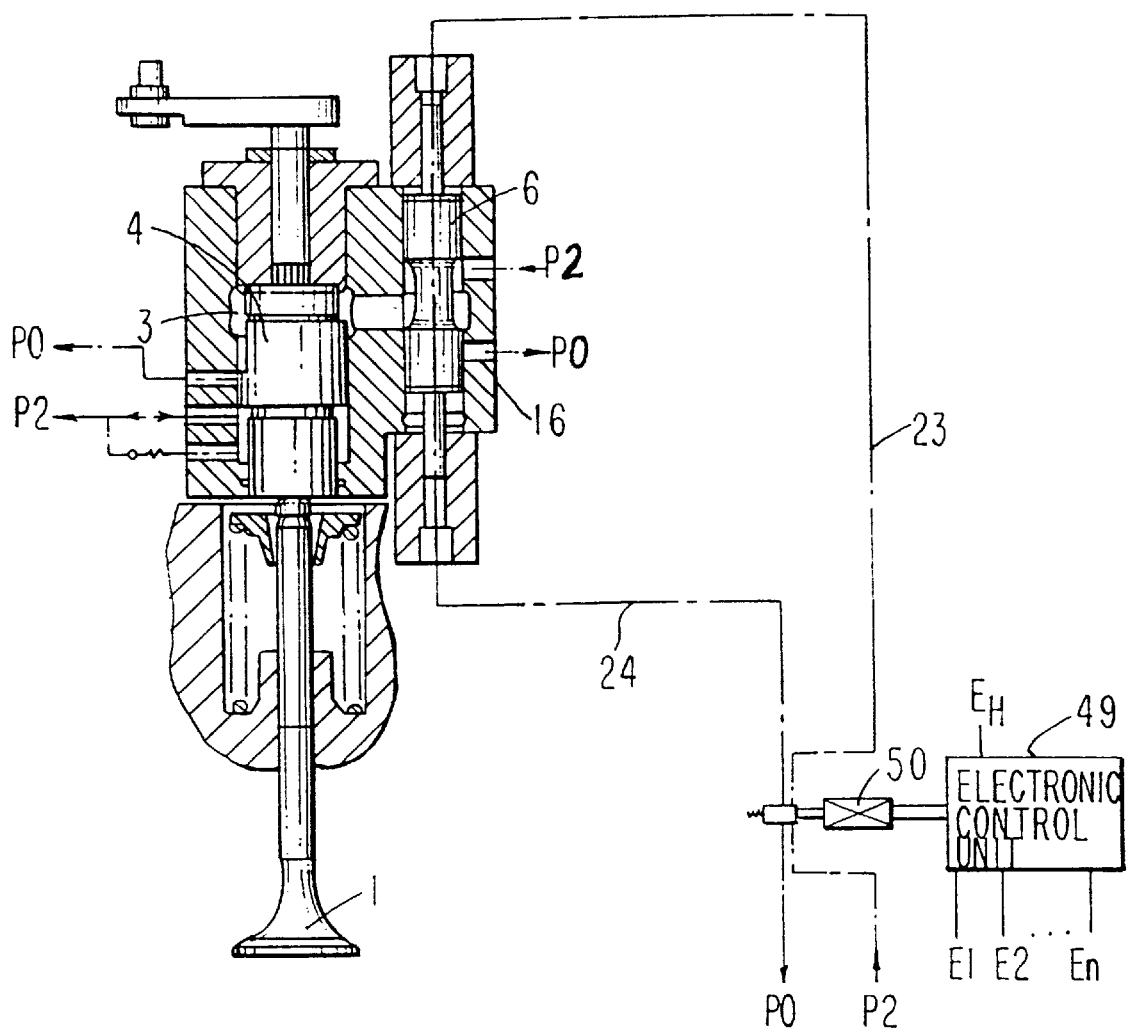
FIGS. 3A and 3B show a third embodiment in which with the gas valve is controlled by means of an electronic, hydraulic pilot control.

FIGS. 1A, 1B and 1C show a gas or exhaust valve 1 to be controlled of a gas engine, e.g., a diesel engine, which is arranged before an inlet valve (not shown) to the combustion space of the gas engine, for example. The gas valve 1 can be moved in translatory fashion by a maximum stroke H out of its shown position interrupting the flow of gas 2 into the dashed-line position 1' in that, in its shown closed position, the upper work space 3 above the piston 4 connected to the gas valve 1 is pressurized at pressure P2, i.e., the control pressure, which acts against the return force of a gas-valve return spring 5. In order to deflect the gas valve 1 out of the depicted state and into the dashed-line position by means of a movable control apparatus, which in this case is a control device designed as a control slide valve 6, the control pressure P2 produced by a pump is connected through to the upper work space 3 from a pressure supply line 7 via a pressure supply bore 8, along a pressure control recess 9 on the control slide valve 6, via a pressure supply channel 10 to the upper work space 3 located above the piston 4 connected to the gas valve 1. As a result, the piston 4 is deflected downward out of the depicted position by no more than the stroke H (FIG. 1A), until the slanted control edge 12 passes the return bore 20, so that the pressure medium subjected to the pressure P2 is now returned via a pressure return line (not shown in detail) to the oil return container 14.

On the other hand, when the control slide valve 6 is in the lower position in FIG. 1A, then in order to return the gas valve 1 from the dashed-line position to the depicted position, the upper work space 3 above the piston 4 is connected via the supply channel 10, the control recess 9 on the control slide valve 6 and the return bore 16 to the return line 15 leading to the oil return container 14. As a result, the piston 4 is returned by the return force of the gas-valve return spring 5. The lower work space 17 below the piston 4 is filled with hydraulic oil via the supply bore 19, which is connected to a back-pressure valve 18. The middle return bore 20, which limits the downward translatory deflection of the piston 4, also lets hydraulic oil into and out of the lower work space 17.

The piston 4 moves in the direction of its cylinder bottom until the control edge 12 closes the bore 20 by covering it. The oil that is located in the work space 17 and supplied via the bores 19, 20 can no longer escape through the bore 20 and is thus placed under pressure, so that the piston movement ceases. At the same time, the control edge 12 opens the return bore 11. The control pressure oil P2 acting on the piston upper side in the upper work space 3 can partially flow off as P0. In this way, the piston movement and any possible recoil is dampened and the high-pressure peaks are eliminated.

Switching over the control slide valve 6 between an upper position that pressurizes the piston 4 in order to deflect the gas valve 1 into the dashed-line lower position, on the one hand, and, on the other hand, the lower position (not shown) that permits the return of the piston 4 for the purpose of returning the gas valve 1 to the depicted position by releasing the recycling of the hydraulic oil located in the upper work space 3 is carried out by pressurizing, with pressure surges, the upper 21 or the lower 22 face of the control slide valve 6 via the respective pressure lines 23, 24 connected to the respective surfaces 21, 22. A pressure surge in the pressure line 23 is produced by deflecting a pilot control forcer 29 deflectable on the face 25 against the return force of a spring 26 by a control cam 28 arranged on a cam shaft 27.

When the pilot control forcer 29 is deflected by the control cam 28, a pressure surge is transmitted via the pressure line 23 to the upper face 21 of the control slide valve 6, so that the slide valve 6 is moved out of the upper position shown into the lower position (not shown). The slide valve 6 thereby blocks the supply line 7 and frees the recycling bore 16. The maximum downward deflection of the control slide valve 6 during this pressure surge is established by a stop on the housing. A shutdown bore 30 is used to prevent a pressure increase in the lines after the particular end position of the control slide valve 6 has been reached. The pressure surge that causes the deflection of the control slide valve is transmitted via the lower surface 22 of the control slide valve 6 to the other pressure line 24, out of which hydraulic fluid can flow via the back-pressure valve 31. After passing the control cam 28 that initiates the stroke of the control slide valve 6, the pilot control forcer 29 is returned by the return force of the spring 26 into its lower position in FIG. 1C and hydraulic fluid can flow at the pressure P1, i.e., the operating pressure, into the pressure line 23 via the back-pressure valve 32. The influx of hydraulic oil into the pressure line 23 corresponds to the normal passage direction of the valve 32. In order to permit the deviating flow of hydraulic oil, e.g., out of the pressure line 23, during an upward stroke of the control slide valve 6, the pressure surge exercised during this stroke on the pressure line 24 is transmitted to the back-pressure valve 32 in a way that allows passage through the back-pressure valve 32, e.g., by deflection of the valve body with pins out of the back-pressure position, etc., against the passage direction of the back-pressure valve.

The upward deflection of the control slide valve 6 is correspondingly initiated by transmission of a pressure surge when a control cam 34 on the pilot control forcer 35 passes via the pressure line 24 to the lower surface 22 of the control slide valve 6.

The supply pressure P1 of the pilot control device may be less than or equal to the pressure P2 of the control device.

The control cams 28, 34 are arranged on the camshaft 27 so as to be individually movable in the peripheral direction, in order, for example, to synchronize the valve elevations of different cylinders, or in order to independently adjust the opening timepoint and closing timepoint of the gas valve.

In all examples, the piston 4 can be moved downward when the pressure in the upper work space 3 acts on a larger area of the piston 4, for example, than the pressure in the lower work space 17. This is because the force acting on the piston 4 in each case is the product of the existing pressure and the associated pressure area. In particular, the lower work space 17 can be filled with a compressible pressure medium, such as air, or can be subjected to no pressure or to lower pressure than the upper work space 3.

FIG. 1B shows oil pumps 51, 52 for producing the pressures P1 and P2. In the example in FIG. 1B, the oil pump 52, e.g., the pump of the lubricating oil circuit of the engine, produces the lower pressure P1, while the separate oil pump 51 produces the high pressure P2. In this way, advantageously, one hydraulic circuit is pressurized only at low pressure. It is also possible to use the same pressure P1, P2 for both hydraulic circuits. As a result, according to the setup in FIG. 2B and 3B, only one oil pump 51 is necessary.

As a further example, FIGS. 2A–2C show a way to deflect the control slide valve 6 upward or downward with a rotary slide-valve shaft 40 having the passages 36, 37, 38, 39.

In the depicted size of the passages 36–39, in an intermediate position not shown, none of the passages 36–39 is connected to an inlet or outlet line.

In FIG. 2A, the ports 41, 42, 43, 44 lead from below to one side of the rotary slide-valve shaft 40 and the ports 45, 46, 47, 48 lead from above to the rotary slide-valve shaft 40.

The lower ports 41, 43 are thereby pressurized at the pressure P2, while the ports 42, 44 are connected to the oil return container 14.

On the upper side of the rotary slide-valve shaft 40, the two ports 45, 48 are connected to the low pressure line 24 and the ports 46, 47 are connected to the low pressure line 23.

As a result, by rotating the rotary slide-valve shaft 40 around its axis A—A, it is possible to connect neither of the two pressure lines 23, 24 to the pressure P2 or the oil return container 14. Alternately, as shown here, it is possible to pressurize the pressure line 23 via the port 47, the passage 38, and the port 43 at the pressure P2 and simultaneously to connect the pressure line 24 via the port 48, the passage 39 and the port 44 to the oil return container. Or, in another position (not shown here) of the rotary slide-valve shaft 40, the pressure line 23 can be connected via the port 46, the passage 37 and the port 42 to the oil return container 14 and at the same time the pressure line 24 can be pressurized at pressure P2 via the port 45, the passage 36 and the port 41.

When the pressure line 23 is pressurized with the pressure P2, and the pressure line 24 is connected to the oil return container 14, it is possible, without additional back-pressure valves, overflow elements or the like, to simply and effectively move the control slide valve 6 in translatory fashion from the upper position shown in FIG. 2A into a lower position (not shown in FIG. 2A) in order to close the pressure supply bore 8 and at the same time to free the pressure recycling bore 16. This allows the upper steam space 3 of the piston 4 to move upward with the gas valve 1. The pressure medium—in this case, hydraulic oil—flows out of the low pressure line 24 back into the oil return container 14. Correspondingly, when the low pressure line 24 is pressurized with the pressure P2, the control slide valve 6 moves out of a lower position (not shown) into an upper position, which is shown. The hydraulic fluid then flows out of the lower pressure line 23 into the oil return container 14. Influence is exercised on the control times of the valve 1 by moving the control edges of the passages 36–39 by means of axial movement and/or relative turning of the rotary slide-valve shaft 40.

Figure 3B:
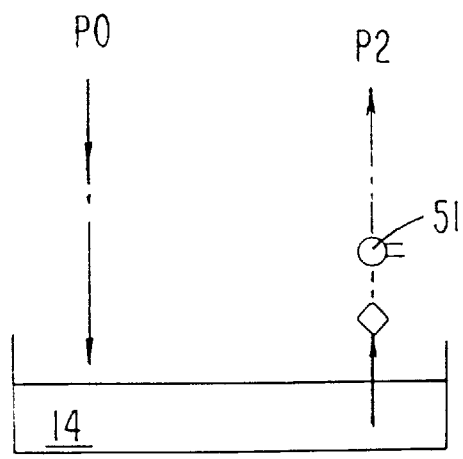

FIGS. 3A and 3B show another example with a pilot control device encompassing an electronic control unit 49. As in the two examples described above, the switchover of the control slide valve 6 between the upper position, which pressurizes the upper work space 3 above the piston 4 with pressure P2, and the lower position, which permits pressure relief of the upper work space 3 via the return bore 16, for the purpose of returning the piston 4 upward with the gas valve 1, is carried out by the pressurization of one of the two pressure lines 23, 24 at pressure P2 and the relief or partial emptying of the other pressure line 23, 24 by means of connection to the oil return container 14. For this purpose, an electromagnetic operating element 50, which can be activated by the electronic control unit 49 and can be switched between at least two positions, is provided here. In a first position of the operating element 50, the pressure line 23 is pressurized with the pressure P2 and the pressure line 24 is connected to the oil return container 14, i.e., to P0. In another position of the operating element 50, the pressure line 23 is connected to the oil return container 14 and the pressure line 24 is pressurized with the pressure P2, so that the control slide valve 6 moves out of a lower position (not shown) into the upper position shown here. In addition, at least one additional position can be provided for the operating element 50, in which the two pressure lines 23, 24 are connected neither to the pressure P2 nor to the oil return container, but rather are both disconnected.

The electronic control unit 49 for controlling the operating element 50 can be supplied with various input data. For example, via the input lines E1, E2 ... En, input signals can be obtained from pickups or other control units with information on the operating mode (type of fuel, consumption-optimized or pollution-optimized), the engine load, the current speed of the internal combustion engine, etc. In addition or alternately, a single channel or multichannel supply of information $E_H$ to a main computer or a subcomputer is possible, e.g., data on the position of the inlet valve, the target and current speeds of the internal combustion engine, the load increase to be expected, and other engine parameters. In this way, it is possible to calculate the opening time and closing time of the controlled gas valve 1 in the electronic control unit 49, and by switching the operating element 50 accordingly it is possible to pressurize the pressure lines 23, 24 at the suitable timepoint, in order to activate the control slide valve 6.

As a alternative to the arrangement shown, it would also be possible to use an operating element 50 in the form of two electromagnetic valves, for example, instead of the control slide valve 6. This would allow the upper work space 3 to be pressurized with pressure P2 or connected to the oil return container 14 not via the control slide valve 6, but rather directly via an operating element 50 replacing the control slide valve 6 and arranged at its position, for example. It is thus possible to dispense with one hydraulic control circuit and make the arrangement even more economical and less susceptible to malfunction.

The invention relates particularly to a device for controlling the gas supply valve of a gas engine. However, corresponding arrangements can also be used to control other valves, especially the inlet and outlet valves of an internal combustion engine.

The invention is not limited to the examples shown. In particular, the arrangement, design and dimensioning of the elements shown can also be embodied according to the invention other than as depicted. In particular, the control slide valve 6 can also be embodied as, for example, an element designed partially analogous to the rotary slide-valve shaft 40 in FIG. 2A or, for example, as a flap, etc.

Instead of the rotary slide-valve shaft 40 in FIG. 2A, a control disk, which has axial passages for the control oil, is also possible.

The invention is not limited by the embodiments described above which are presented as examples only but can be modified in various ways within the scope of protection defined by the appended patent claims.

I claim:

1. A device for controlling at least one valve of an internal combustion engine, comprising: a piston arranged in a working cylinder and operatively engagable with the valve, the piston being pressurized on a pressurization side with a pressure medium; a control device arranged before the piston and including a movable control slide valve for pressurizing a work space of the working cylinder with a pressure medium in order to open the valve and relieving pressure to close the valve; pilot control means for controlling the control slide valve: a first pressure line in fluid communication between the control device and the pilot control means; and a second pressure line in fluid communication between the pilot control means and the control device, the pilot control means being operative so that the control slide valve is brought into a position that pressurizes the work space with pressure medium by opening and closing the first pressure line and into a relief position in which the pressure medium exits the work space by opening and closing the second pressure line time independent of the first pressure line.

2. A device as defined in claim 1, wherein the pressure medium is hydraulic oil present in a lubricating oil circuit of the engine, and further comprising a first pump in the lubricating oil circuit of the engine to produce a supply pressure P1 and a separate pump provided so as to produce a control pressure P2.

3. A device as defined in claim 1, wherein the pressure medium is hydraulic oil, and further comprising a hydraulic oil storage container, and a recycling line connected to the hydraulic oil storage container and two recycling bores arranged in the control device in respective positions associated with a maximum deflection of the control slide valve.

4. A device as defined in claim 3, and further comprising pump means for pumping the hydraulic oil from the hydraulic oil storage container, the pressure lines being arranged to connect the pilot control means to end surfaces of the control slide valve, and further comprising a pressure supply line arranged between the pump means and the pilot control means.

5. A device as defined in claim 1, wherein the pilot control means includes a pair of control cams arranged on a control shaft, and a pair of pilot control forcers each having a surface respectively deflectable by one of the control cams, the pressure lines respectively connecting the pilot control forcer surfaces to the surfaces of the control slide valve, the pilot control forcers having adjustable control edges for adjusting control of opening and closing of the first and second pressure lines.

6. A device as defined in claim 5, and further comprising a back-pressure valve arranged in one of the pressure lines that leads from the surface of the pilot control forcer to the surface of the control slide valve for refilling the pressure line with hydraulic oil during a downward movement of the pilot control forcer associated with the pressure line.

7. A device as defined in claim 6, and further comprising another back-pressure valve arranged in the other of the pressure lines and being operative so that in case of pressure surge pressurization of the pressure line by elevation of the pilot control forcer associated therewith the another back-pressure valve associated with the other pressure line can be unblocked by the pressure-surge pressurization in order to permit the hydraulic oil to flow out of the other pressure line in the blocked direction via an unblocking line.

8. A device as defined in claim 1, wherein the pilot control means includes a rotating control apparatus.

9. A device as defined in claim 8, wherein the rotating control apparatus is a rotary slide-valve shaft with passages for the hydraulic oil.

10. A device as defined in claim 9, wherein the rotary slide-valve shaft is configured so that, as a function of rotational position of the rotary slide-valve shaft, at most one of the two pressure lines leading to the faces of the control slide valve can be pressurized with a pressure (P2), and the other of the pressure lines is connected to an oil storage container.

11. A device as defined in claim 1, wherein the pilot control means includes an operating element operative to switch, relative to one another, the two pressure lines leading to the control slide valve, a supply line and a recycling line leading to an oil storage container, and an electronic control unit operatively connected to the operating element to electronically control the operating element.

12. A device as defined in claim 11, wherein the electronic control unit is an electromagnetic control unit.

13. A device as defined in claim 11, and further comprising switchover means controlled by the electronic control unit for connecting one of the pressure lines which come from the control slide valve to the pressure supply line and for connecting the other of pressure lines to the recycling line and the oil return container.

14. A device as defined in claim 1, and further comprising spring means for opposing a force of the pressure medium on the piston.

* * * * *